US012608478B2

(12) United States Patent
Moorthy et al.

(10) Patent No.: US 12,608,478 B2
(45) Date of Patent: *Apr. 21, 2026

(54) EXTENDED FIRMWARE MANAGEMENT OPERATION TO DYNAMICALLY RESTORE NVMe BOOT PARTITION

(71) Applicant: Dell Products L.P., Round Rock, TX (US)

(72) Inventors: Gowtham Moorthy, Namakkal (IN); Shekar Babu Suryanarayana, Bangalore (IN); Ranjan Kumar, Siliguri (IN)

(73) Assignee: Dell Products L.P., Round Rock, TX (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/421,118

(22) Filed: Jan. 24, 2024

(65) Prior Publication Data

US 2025/0238516 A1     Jul. 24, 2025

(51) Int. Cl.
*G06F 21/57*        (2013.01)

(52) U.S. Cl.
CPC .................................. *G06F 21/572* (2013.01)

(58) Field of Classification Search
CPC ..................................................... G06F 21/572
See application file for complete search history.

(56) References Cited

U.S. PATENT DOCUMENTS

| | | | | | |
|---|---|---|---|---|---|
| 2002/0147941 | A1* | 10/2002 | Gentile | ............... | G06F 11/1417 |
| | | | | | 714/36 |
| 2025/0238235 | A1* | 7/2025 | Kumar | .................. | G06F 9/4401 |
| 2025/0238236 | A1* | 7/2025 | Kumar | .................. | G06F 9/4401 |
| 2025/0238237 | A1* | 7/2025 | Moorthy | ............... | G06F 9/4401 |
| 2025/0238238 | A1* | 7/2025 | Kumar | .................... | G06F 9/541 |
| 2025/0238239 | A1* | 7/2025 | Kumar | .................. | G06F 9/4403 |
| 2025/0238326 | A1* | 7/2025 | Moorthy | ............... | G06F 9/4403 |
| 2025/0238516 | A1* | 7/2025 | Moorthy | ............... | G06F 21/572 |
| 2025/0244991 | A1* | 7/2025 | Rudraprakash | ........... | G06F 8/65 |
| 2025/0245015 | A1* | 7/2025 | Barigi | .................. | G06F 9/4403 |
| 2025/0245017 | A1* | 7/2025 | D R | ...................... | G06F 9/4405 |
| 2025/0245018 | A1* | 7/2025 | Suryanarayana | ..... | G06F 9/4408 |
| 2025/0245019 | A1* | 7/2025 | Surekar | ............... | G06F 9/4416 |
| 2025/0245333 | A1* | 7/2025 | Suryanarayana | ....... | G06F 21/44 |
| 2025/0245337 | A1* | 7/2025 | Deshpande | ........... | G06F 21/572 |
| 2025/0251941 | A1* | 8/2025 | Suryanarayana | ..... | G06F 9/4401 |
| 2025/0251942 | A1* | 8/2025 | Suryanarayana | ..... | G06F 9/4403 |
| 2025/0252185 | A1* | 8/2025 | Suryanarayana | ..... | G06F 21/572 |
| 2025/0252186 | A1* | 8/2025 | Alatgi | .................. | G06F 21/572 |

OTHER PUBLICATIONS

List of Patents or Applications Treated as Related, Feb. 2024.

* cited by examiner

*Primary Examiner* — Terrell S Johnson
(74) *Attorney, Agent, or Firm* — Terrile, Cannatti & Chambers, LLP; Stephen A. Terrile

(57)        ABSTRACT

A firmware management operation. The firmware management operation includes providing an information handling system with a distributed BIOS, the distributed BIOS including a BIOS component and a BIOS variable; identifying a processor environment installed on an information handling system from a plurality of processor environments; and, performing an extended firmware management operation, the extended firmware management operation recovering a copy of the BIOS component from a remote memory storage location.

20 Claims, 11 Drawing Sheets

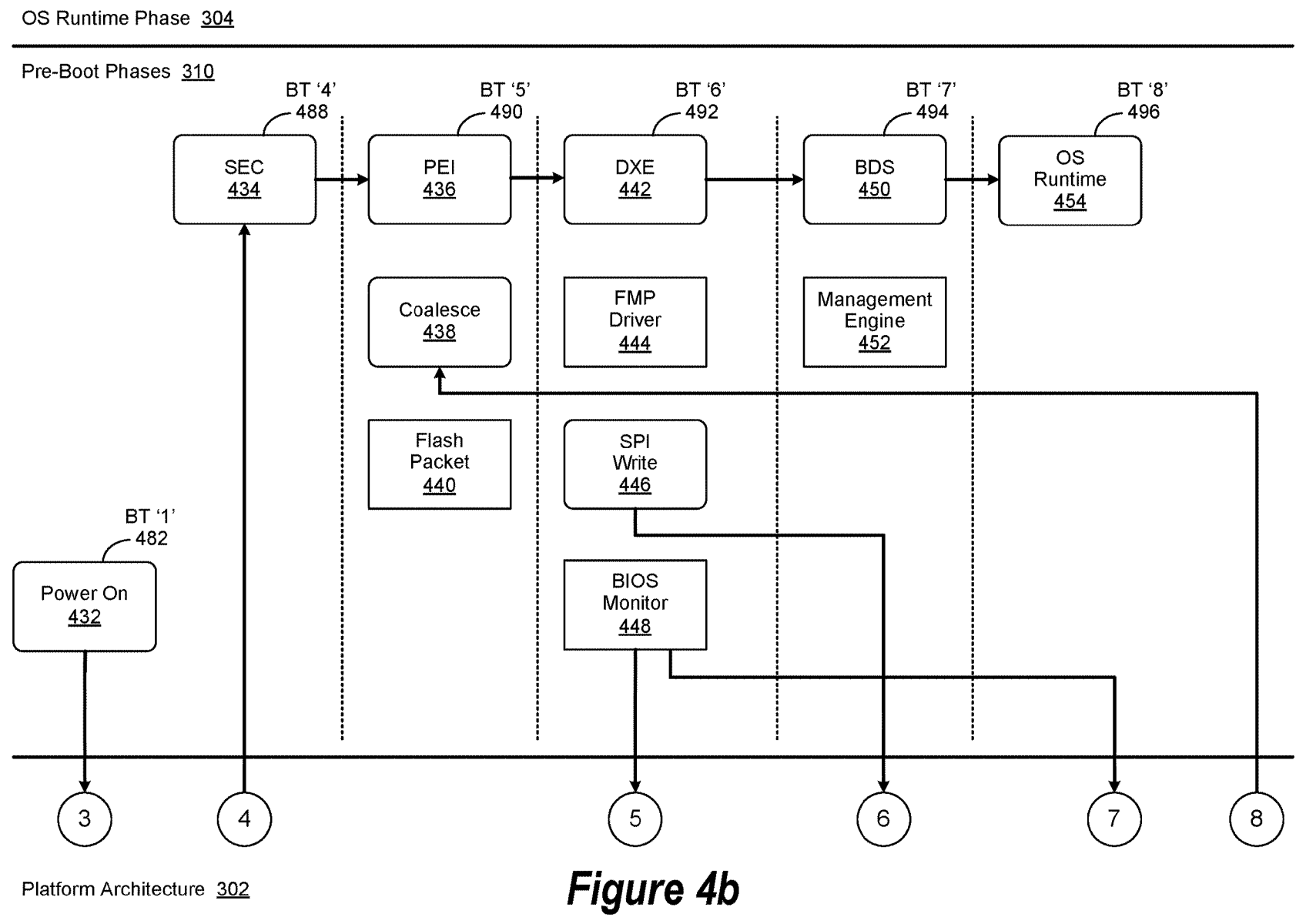

OS Runtime Phase 304

Pre-Boot Phases 310

Power On
432

BT '1'
482

SEC
434

BT '4'
488

PEI
436

BT '5'
490

Coalesce
438

Flash
Packet
440

DXE
442

BT '6'
492

FMP
Driver
444

SPI
Write
446

BIOS
Monitor
448

BDS
450

BT '7'
494

Management
Engine
452

OS
Runtime
454

BT '8'
496

Platform Architecture 302

*Figure 4b*

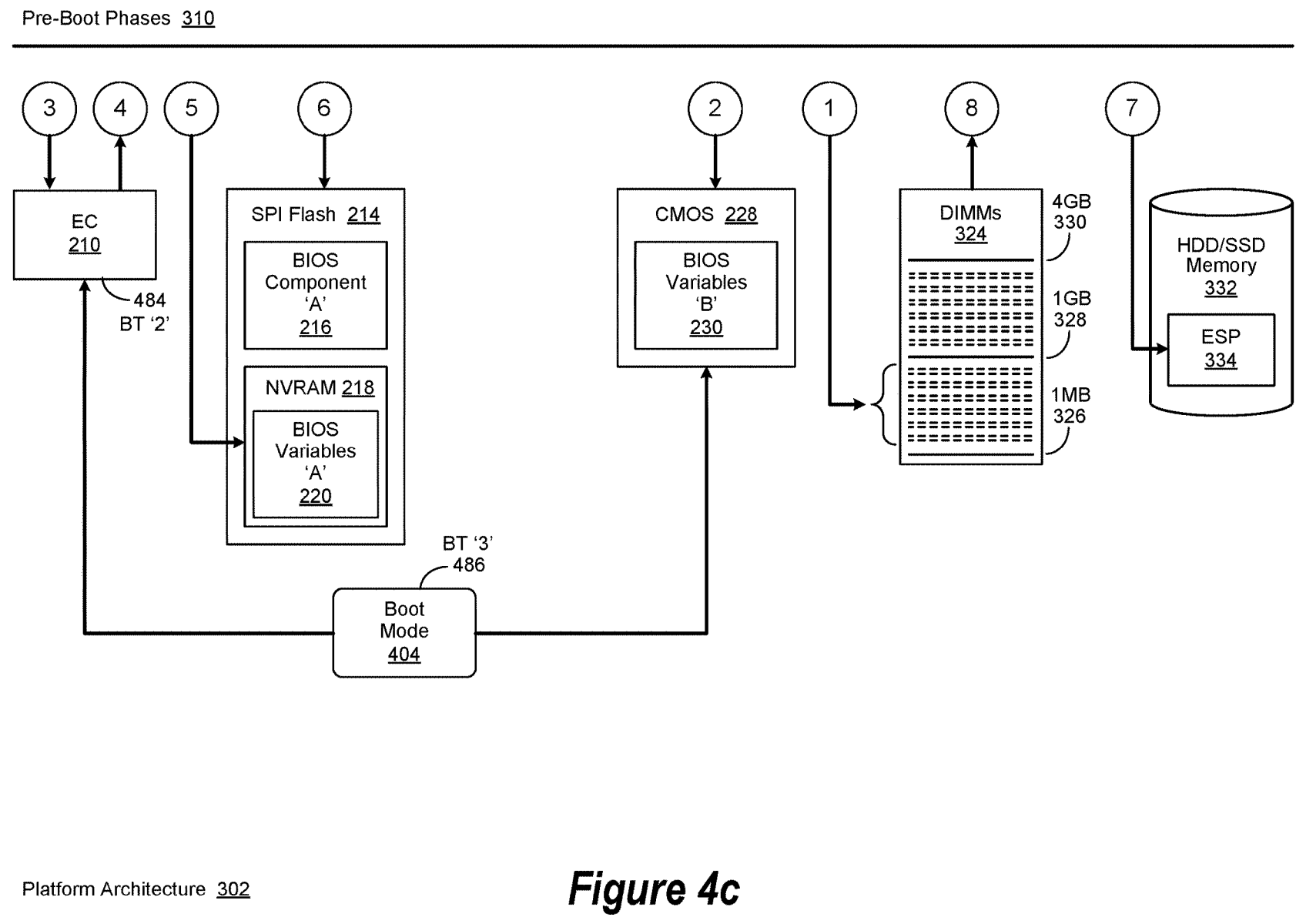

Pre-Boot Phases 310

⑦ → HDD/SSD Memory 332 — ESP 334

⑧ → DIMMs 324 — 4GB 330, 1GB 328, 1MB 326

① →

② → CMOS 228 — BIOS Variables 'B' 230

⑥ → SPI Flash 214 — BIOS Component 'A' 216, NVRAM 218 — BIOS Variables 'A' 220

⑤ →

④ ← EC 210 — BT '2' 484

③ →

Boot Mode 404 — BT '3' 486

*Figure 4c*

Platform Architecture 302

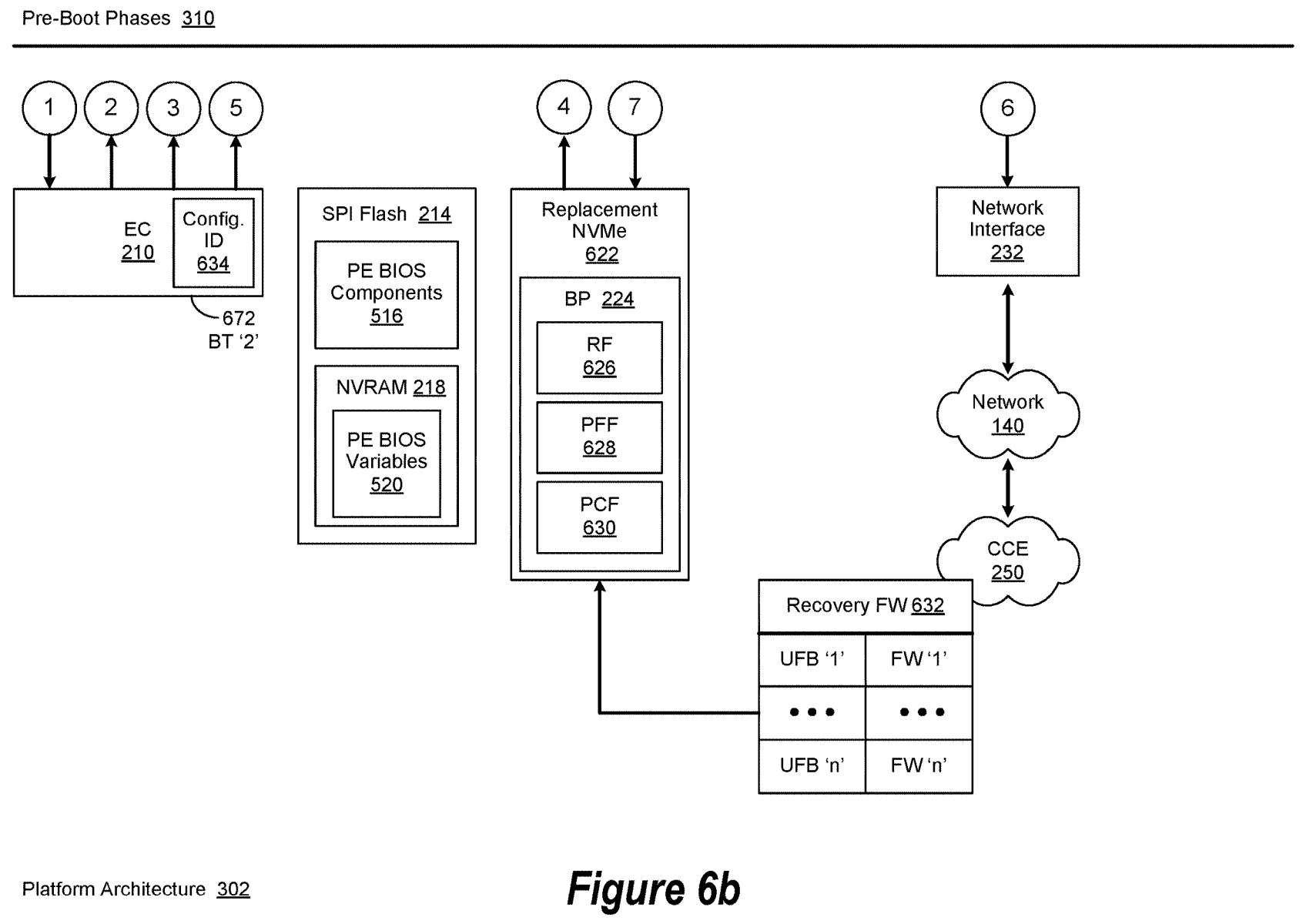

Pre-Boot Phases 310

Network Interface 232

Network 140

CCE 250

Recovery FW 632

| UFB '1' | FW '1' |
| ⋮ | ⋮ |
| UFB 'n' | FW 'n' |

Replacement NVMe 622

BP 224

RF 626

PFF 628

PCF 630

SPI Flash 214

PE BIOS Components 516

NVRAM 218

PE BIOS Variables 520

EC 210

Config. ID 634

672 BT '2'

Platform Architecture 302

*Figure 6b*

EXTENDED FIRMWARE MANAGEMENT OPERATION TO DYNAMICALLY RESTORE NVMe BOOT PARTITION

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed BIOS, the distributed BIOS including a BIOS component and a BIOS variable; identifying a processor environment installed on an information handling system from a plurality of processor environments; and, performing an extended firmware management operation, the extended firmware management operation recovering a copy of the BIOS component from a remote memory storage location.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS, the distributed BIOS including a BIOS component and a BIOS variable; identifying a processor environment installed on an information handling system from a plurality of processor environments; and, performing an extended firmware management operation, the extended firmware management operation recovering a copy of the BIOS component from a remote memory storage location.

In another embodiment the invention relates to a computer-readable storage medium embodying computer program code, the computer program code comprising computer executable instructions configured for: providing an information handling system with a distributed BIOS, the distributed BIOS including a BIOS component and a BIOS variable; identifying a processor environment installed on an information handling system from a plurality of processor environments; and, performing an extended firmware management operation, the extended firmware management operation recovering a copy of the BIOS component from a remote memory storage location.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a through 4c are a simplified block diagram showing the performance of certain distributed firmware management operations;

FIGS. 6a and 6b are a simplified block diagram showing the performance of extended firmware management operations to recover a copy of one or more BIOS components stored in a non-local memory storage location and restore them to a local memory storage location.

DETAILED DESCRIPTION

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that it is common to store BIOS components that are specific to an IHS's processor environment (PE), described in greater detail herein, in Serial Peripheral Interface (SPI) Flash memory. Likewise, various aspects of the invention reflect an appreciation that it is also common to store BIOS components that are associated with other aspects of an IHS in Non-Volatile Memory express (NVMe) memory. However, various aspects of the invention reflect an appreciation that SPI Flash memory is typically not removable, while NVMe memory is. Accordingly, various aspects of the invention reflect an appreciation that replacement of an IHS's NVMe memory may result in the loss of certain platform BIOS components, which in turn could result in unintended IHS operational or performance issues, or even failure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
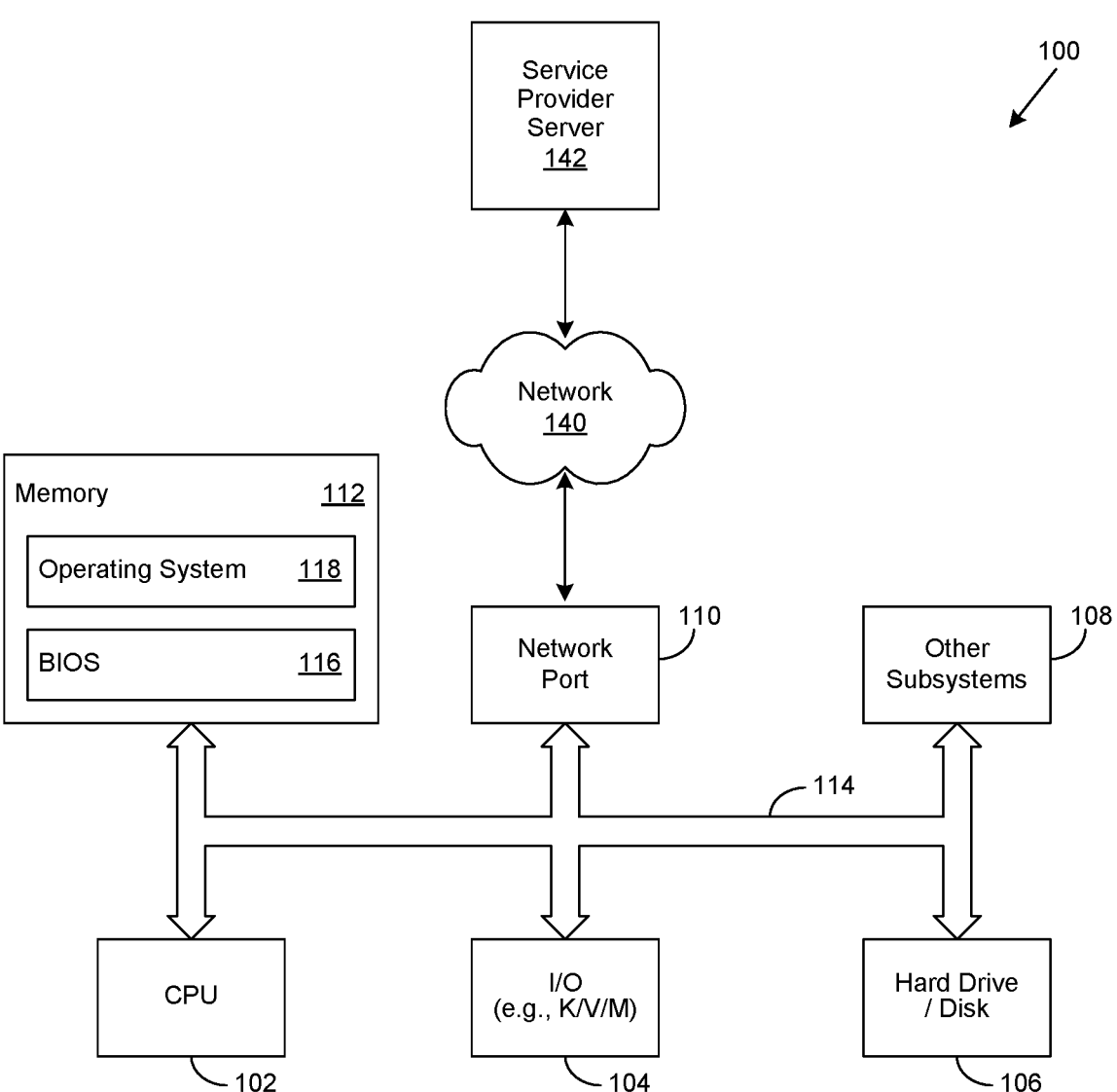
FIG. 1 shows a general illustration of components of an information handling system as implemented in the system and method of the present invention.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In certain embodiments, the firmware management operation may be performed during operation of an IHS 100. In various embodiments, performance of the firmware management operation may result in the realization of improved operation of an IHS 100.

Figure 2:
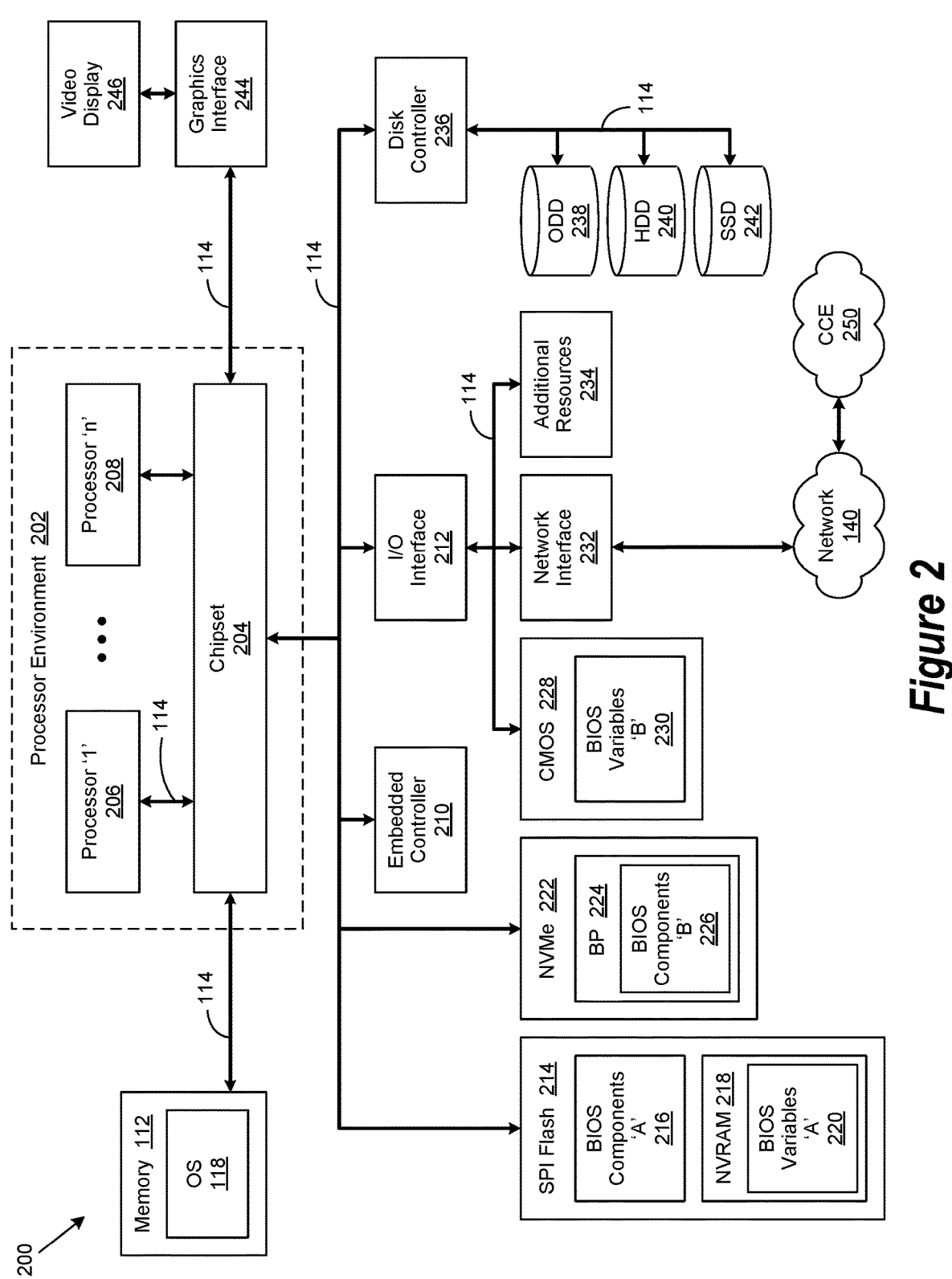
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208.

As an example, processors '1' 206 through 'n' 208 of a particular PE 202 may be implemented to be the same in a server. In this example, each processor may be assigned to be a resource to one or more virtual machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234. or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
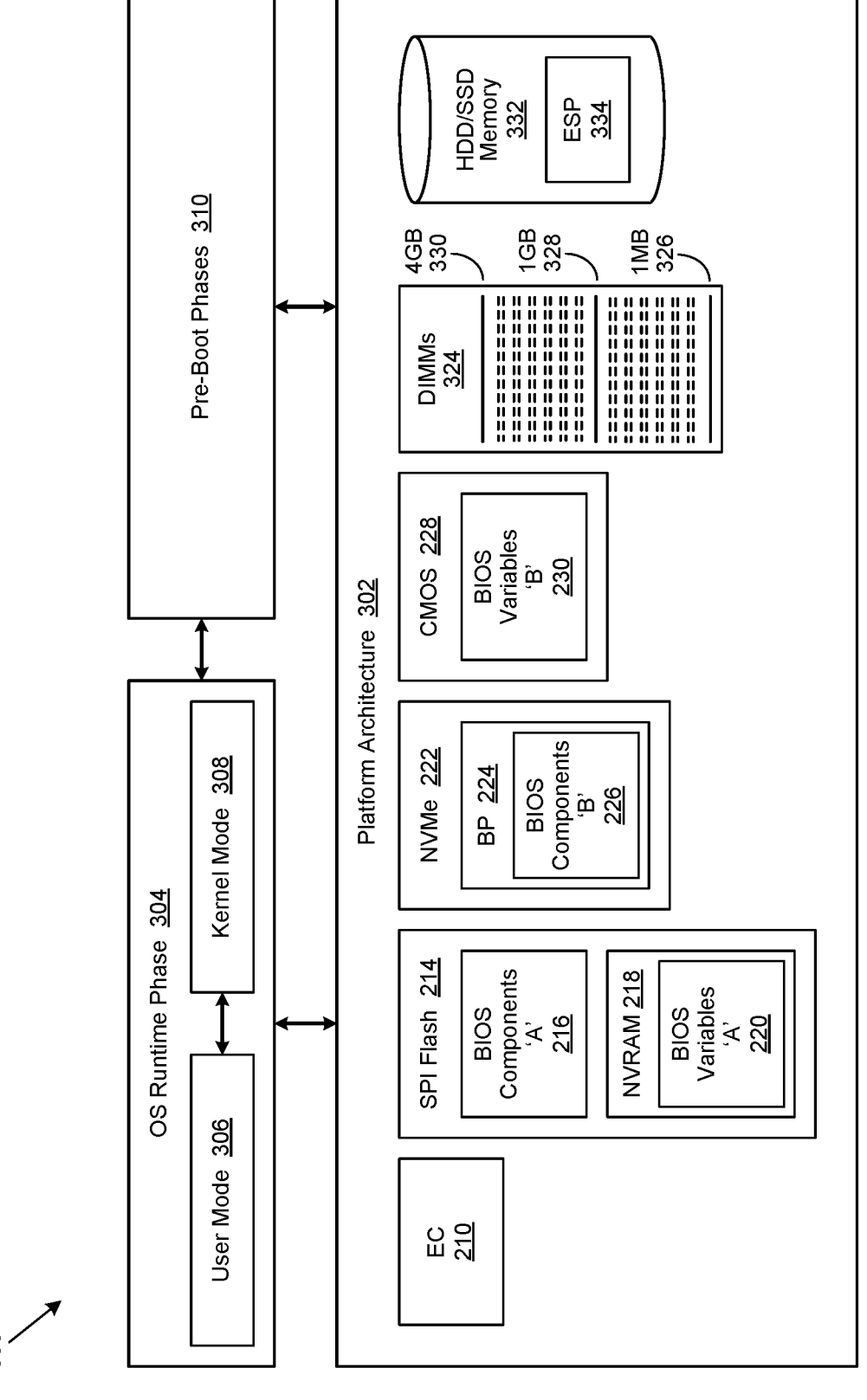
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, Nvidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, Serial Peripheral Interface (SPI) Flash 214 memory, Non-volatile Memory Express (NVMe) 222 memory, and a complementary metal-oxide-semiconductor (CMOS) 228 chip, or a combination thereof, as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
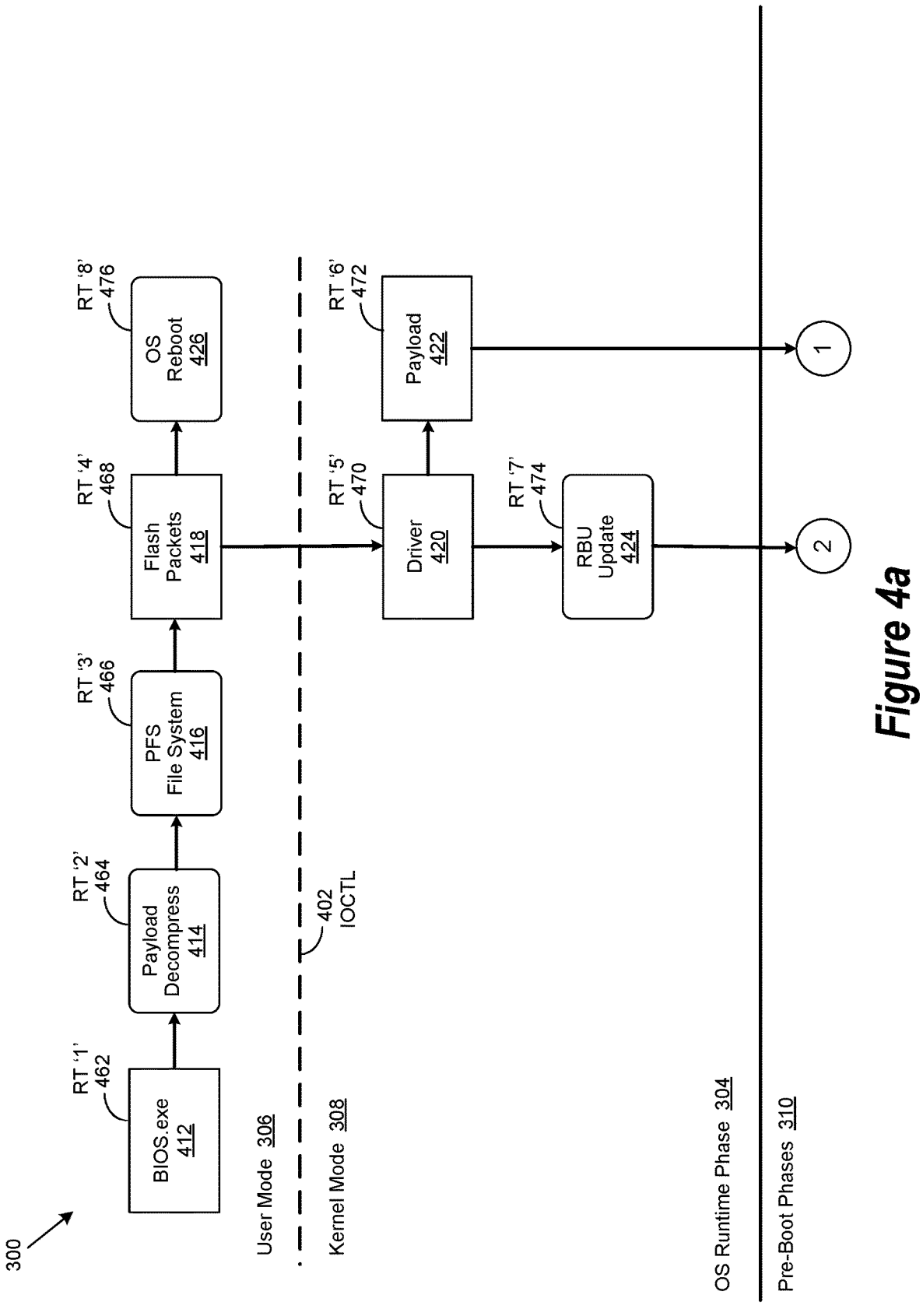

FIGS. 4a through 4c are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4a, a distributed firmware management operation may be initiated by the ASDFMP 300 receiving a BIOS.exe 412 file in runtime (RT) step '1'. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver eXecution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) drivers 444. In general, the DXE Core component is responsible for producing a set of boot services, DXE services, and RT Services. Likewise, the DXE Dispatcher component is responsible for discovering and executing FMP drivers 444 in the correct order. In turn, the FMP drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5A:
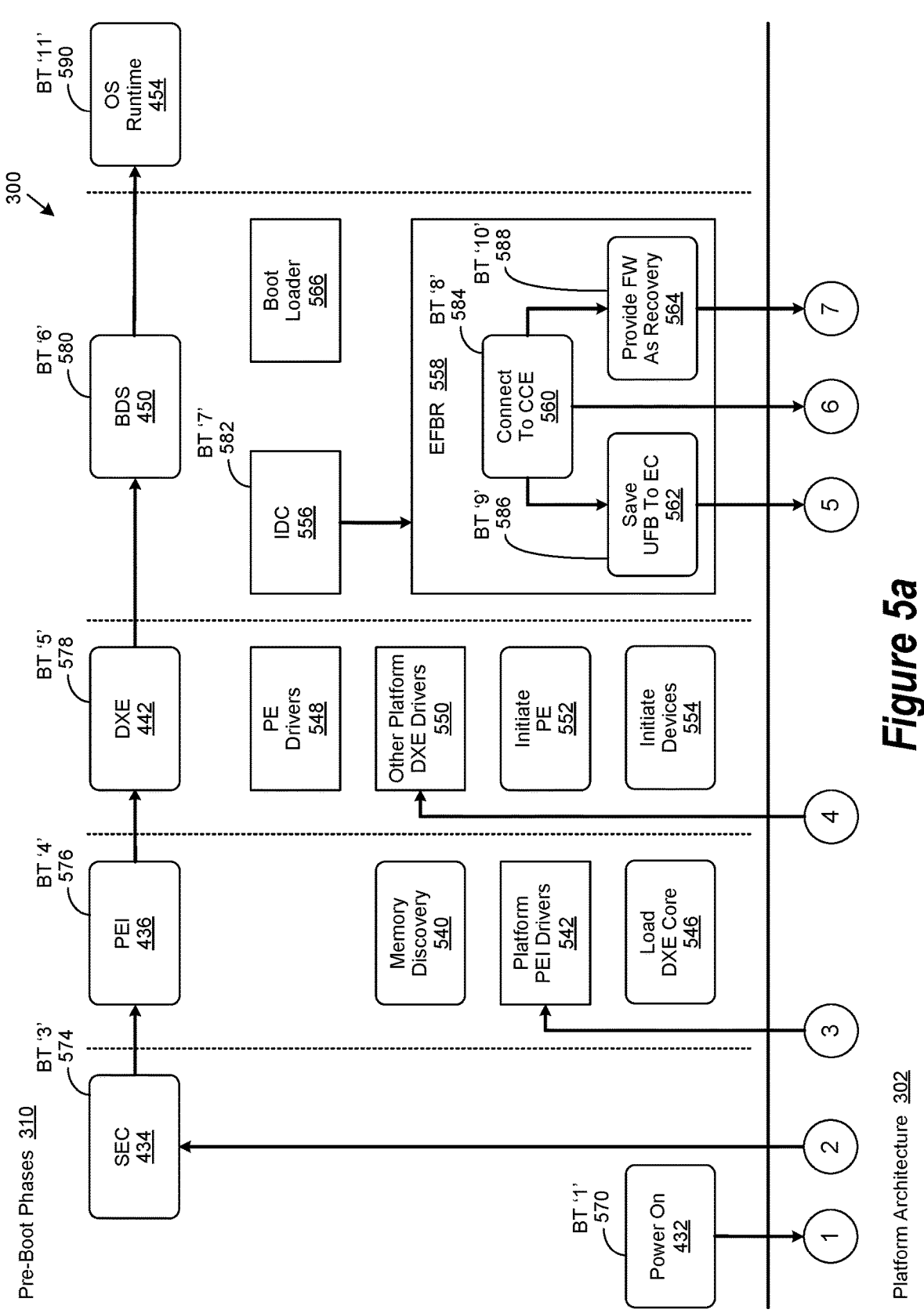
FIGS. 5a and 5b are a simplified block diagram showing the performance of extended firmware management operations to store a copy of one or more Basic Input/Output System (BIOS) components in a non-local memory storage location.
Figure 5B:
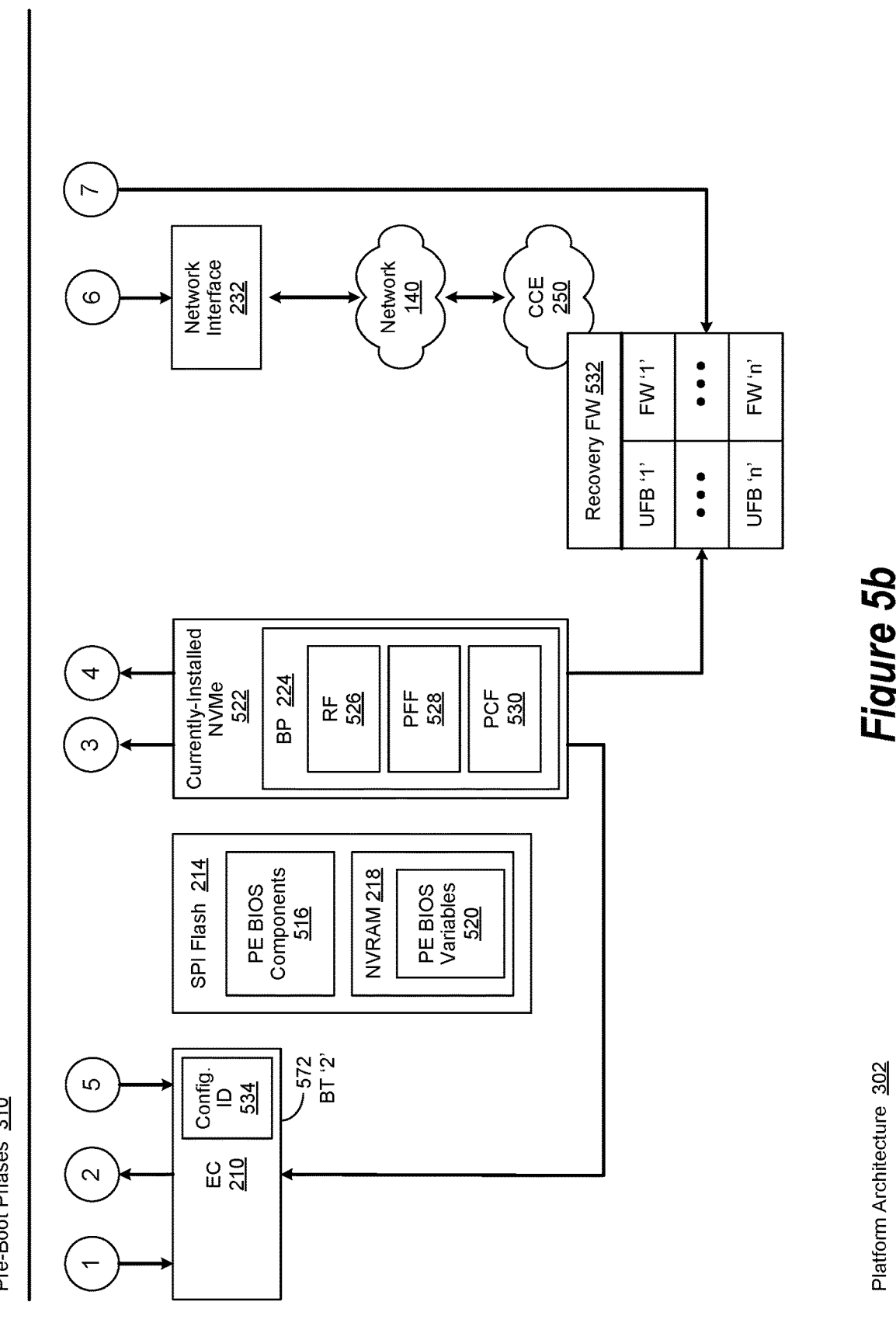

FIGS. 5*a* and 5*b* are a simplified block diagram showing the performance of extended firmware management operations implemented in accordance with an embodiment of the invention to store a copy of certain Basic Input/Output System (BIOS) components in a non-local memory storage location (i.e., a remote storage location). In various embodiments, a distributed firmware management operation, described in greater detail herein, may be implemented to include one or more extended firmware management operations. As used herein, an extended firmware management operation broadly refers to any task, function, operation, procedure, or process performed in an architecture-specific distributed firmware management platform (ASDFMP) 300, described in greater detail herein, to manage the copying, or restoration, of one or more of its associated BIOS components, likewise described in greater detail herein, from one memory storage location to another. In various embodiments, one memory storage location used in the performance of an extended firmware may be local to a particular ASDFMP 300, while another may not.

As an example, an ASDFMP 300 may be implemented to include Non-Volatile Memory express (NVMe) memory, described in greater detail herein, which may be implemented to include a boot partition (BP), likewise described in greater detail herein. To continue the example, the BP may in turn be implemented to receive, store, manage, and provide access to one or more BIOS components used to boot the ASDFMP 300. To continue the example further, one or more extended firmware management operations may be performed to copy the one or more BIOS components from the NVMe memory BP to another location, such as cloud-based storage, familiar to skilled practitioners of the art.

To continue the example yet further, the NVMe memory might be replaced at some point in time (e.g., due to failure, being upgraded, and so forth), and as a result, the ASDFMP 300 cannot be booted until the one or more previously-stored BIOS components are restored to the replacement NVMe memory. To continue the example yet further still, one or more extended firmware management operations may be performed to copy the one or more BIOS components from where they are stored to the new NVMe memory, and by doing so, enable the ASDFMP 300 to be booted. In this example, the NVMe memory storage location is local to the ASDFMP 300, and the other memory storage location, such as the cloud based storage, is not.

In various embodiments, the ASDFMP 300 may be implemented to include various pre-boot phases 310 and a platform architecture 302. In various embodiments, as described in greater detail herein, the platform architecture 302 may be implemented to include an embedded controller (EC) 210, System Peripheral Interface (SPI) Flash 214 memory, currently-installed NVMe 522 memory, and a network interface 232, or a combination thereof.

In various embodiments, the SPI Flash 214 memory may be implemented to receive, store, manage, and provide access to one or more processor environment (PE) BIOS components 516, described in greater detail herein. In various embodiments, the SPI Flash 214 memory may be implemented to include certain Non-Volatile Random Access Memory (NVRAM) 218, likewise described in greater detail herein. In various embodiments, the NVRAM 218 may in turn be implemented to receive, store, manage, and provide access to one or more PE BIOS variables 520, such as configuration settings, for use by the BIOS of an associated information handling system (IHS), described in greater detail herein.

In various embodiments, the currently-installed NVMe 522 memory may be implemented to include a boot partition (BP) 224. Those of skill in the art will be familiar with the concept of a BP 224, which in common usage broadly refers to a primary memory partition that contains a boot loader, which is a portion of program code responsible for booting the operating system (OS) of an associated IHS. In various embodiments, the BP 224 may in turn be implemented to receive, store, manage, and provide access to one or more recovery firmware (RF) 526 components, one or more platform feature firmware (PFF) 528 components, or one or more platform core firmware (PCF) 530 components, or a combination thereof. In various embodiments, the currently-installed NVMe 522 memory may be implemented without a BP 224. Nonetheless, the currently-installed NVMe 522 memory may be implemented in certain of these embodiments to still receive, store, manage, and provide access to one or more RF 526 components, one or more PFF 528 components, or one or more PCF 530 components, or a combination thereof. In various embodiments, the network interface 232 may be implemented to provide access and connectivity to a network 140. In turn, the network 140 may be implemented in various embodiments to provide access and connectivity to a cloud computing environment (CCE) 250, described in greater detail herein.

Referring now to FIG. 5a, extended firmware management operations may be initiated by power being applied 432 to the ASDFMP 300 in pre-boot time (BT) step '1' 570. An embedded controller (EC) 210 is then invoked in BT step '2' 572 for future use in one or more extended firmware management operations, as described in greater detail herein. Thereafter, one or more security (SEC) 434 phase operations may then be performed in BT step '3' 574, followed by the performance of one or more Pre Extensible Firmware Interface (EFI) Initialization (PEI) 436 phase operations in BT step '4' 576. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated PE, described in greater detail herein. In various embodiments, performance of the PEI 436 phase operation in BT step '4' 576 may include one of more memory discovery operations 540 being performed. In various embodiments, the one or more memory discovery operations 540 may be performed to determine which kind of memory, and its associated configuration and capabilities, may be implemented within the ASDFMP 300. In various embodiments, one or more platform-specific PEI drivers 542 may be retrieved from the BP 224 and then implemented within the ASDFMP 300. Thereafter, a DXE core 546 may be loaded in various embodiments.

In various embodiments, a Driver execution Environment (DXE) 442 phase may then be entered in BT step '5' 578, followed by the implementation of one or more PE drivers 548. In various embodiments, one or more other platform drivers 550, may be retrieved from the BP 224 and then implemented. In various embodiments, the one or more PE drivers 548, and the one or more other platform drivers 550, may respectively be used to initiate the PE 552 and other platform devices 554 associated with the ASDFMP 300.

In various embodiments, a Boot Device Selection (BDS) 450 phase may then be entered in BT step '6' 580. In various embodiments, an identifier (ID) collector (IDC) 556 may be used in BT step '7' 582 to collect certain information related to the ASDFMP 300 in general, and the currently-installed NVMe 522 memory in particular. In various embodiments, the information collected by the IDC 556 may include the ASDFMP's 300 system ID, its service tag, the BIOS version currently implemented on the ASDFMP 300, and so forth. In various embodiments, the information collected by the IDC 556 may likewise include the manufacturer, model, and serial number of the currently-installed NVME 522 memory, its associated namespace and BP 224 ID, and so forth.

In various embodiments, the IDC 556 may be implemented to provide the information it may collect to an extended firmware backup and restore (EFBR) 558 system. In various embodiments, the EFBR 558 system may be implemented to use an associated EFBR protocol to generate a Universal Firmware Binary Large Object (UFB), as described in greater detail herein. In various embodiments, the EFBR 558 system may be implemented in BT step '8' 584 to connect 560 to a CCE 250, as described in greater detail herein. In various embodiments, the EFBR 558 system may be implemented to use the information it received from the IDC 556 to generate a UFB within the CCE 250.

In various embodiments, the EFBR 558 system may be implemented to save 562 the resulting UFB to the EC 210 in BT step '9' 586. In various embodiments, the EFBR 558 system may likewise be implemented to save a unique configuration ID 534, corresponding to the current BIOS component configuration stored in the currently-installed NVMe 522 memory, to the EC 210. In certain embodiments, the unique configuration ID 534 may be generated from various components of the information collected by the IDC 556. In these embodiments, the components of collected information used to generate the unique configuration ID 534, and the method by which it may be generated, is a matter of design choice.

In various embodiments, the EFBR 558 system may be implemented to retrieve the current BIOS component configuration stored in the currently-installed NVMe 522 memory, and store 564 it, along with the previously-generated UFB and configuration ID 534, within a repository of recovery firmware 532 in the CCE 250 in BT step '10' 588. In various embodiments, a boot loader 566 may then be implemented during the BDS 450 phase to launch the ASDFMP 300 into an OS runtime 454 phase in BT step '11' 590.

In various embodiments, the EFBR 558 system may be implemented to store 564 the current BIOS component configuration stored in the currently-installed NVMe 522 memory within the CCE 250 whenever it may be updated. In various embodiments, the EFBR 558 system may be implemented to generate a new configuration ID 534 corresponding to the current BIOS component configuration whenever it may be updated. In certain of these embodiments, the EFBR 558 system may be implemented to use the updated BIOS component configuration, and its corresponding new configuration ID 534 to generate a new UFB version. In various embodiments, each UFB, and its associated BIOS component configuration, may be implemented to have a corresponding version number, or other version tracking mechanism, when it is stored in the repository of recovery firmware 532. In these embodiments, the method by which such versioning may be implemented is a matter of design choice.

Figure 6A:
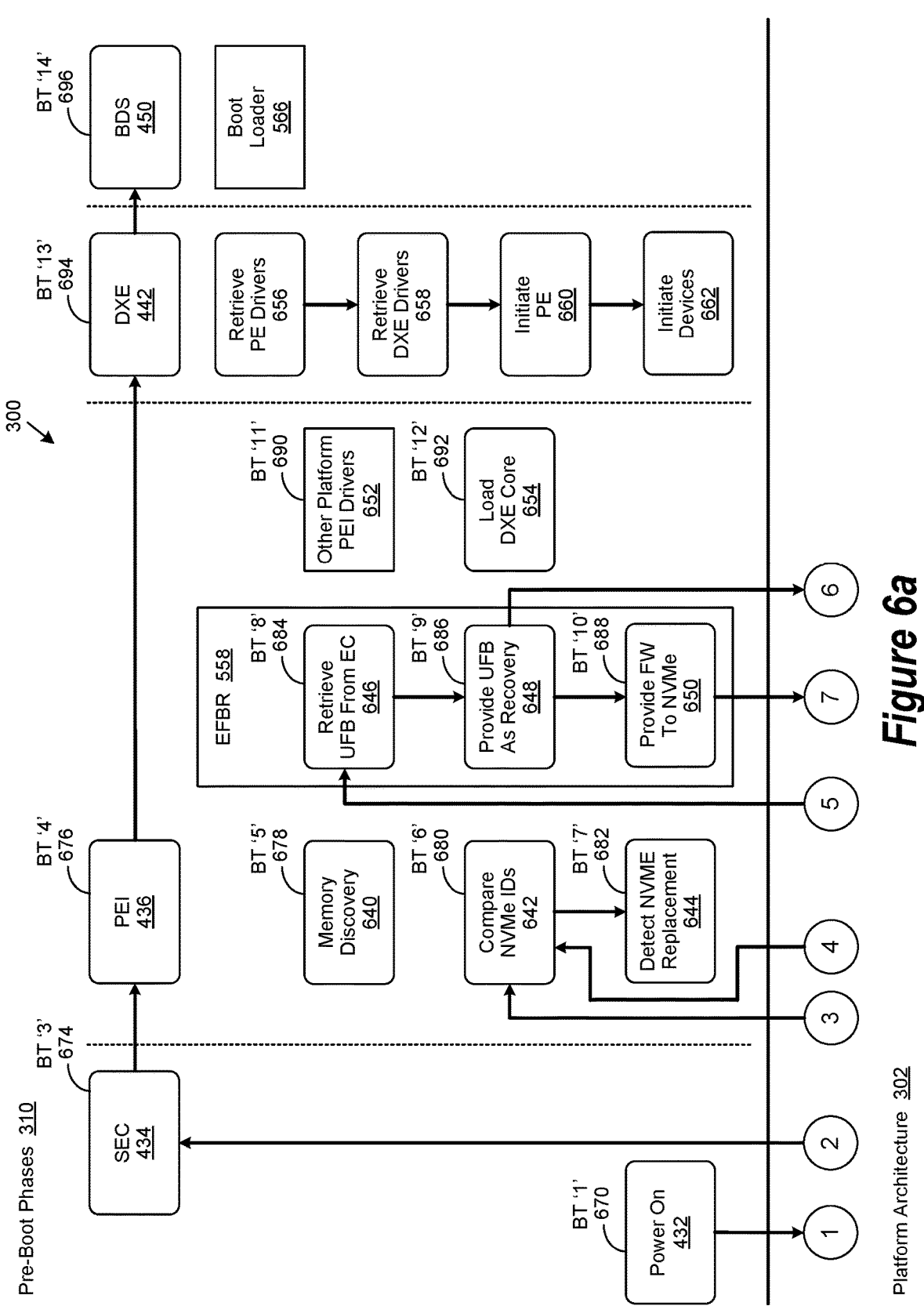

FIGS. 6a and 6b are a simplified block diagram showing the performance of extended firmware management operations implemented in accordance with an embodiment of the invention to recover a copy of one or more Basic Input/Output System (BIOS) components stored in a non-local memory storage location and restore them to a local memory storage location. In various embodiments, a distributed firmware management operation, described in greater detail herein, may be implemented to include one or more extended firmware management operations, described in greater detail herein. In various embodiments, an architecture specific distributed firmware management platform (ASDFMP) 300 may be implemented to include various pre-boot phases 310 and a platform architecture 302. In various embodiments, as described in greater detail herein, the platform architecture 302 may be implemented to include an embedded controller (EC) 210, System Peripheral Interface (SPI) Flash 214 memory, replacement NVMe 622 memory, and a network interface 232, or a combination thereof.

In various embodiments, the SPI Flash 214 memory may be implemented to receive, store, manage, and provide access to one or more processor environment (PE) BIOS components 516, described in greater detail herein. In various embodiments, the SPI Flash 214 memory may be implemented to include certain Non-Volatile Random Access Memory (NVRAM) 218, likewise described in greater detail herein. In various embodiments, the NVRAM 218 may in turn be implemented to receive, store, manage, and provide access to one or more PE BIOS variables 520, such as configuration settings, for use by the BIOS of an associated information handling system (IHS), described in greater detail herein.

In various embodiments, the replacement NVMe 622 memory may be implemented to include a boot partition (BP) 224, described in greater detail herein. In various embodiments, the BP 224 may in turn be implemented to receive, store, manage, and provide access to one or more recovery firmware (RF) 626 components, one or more platform feature firmware (PFF) 628 components, or one or more platform core firmware (PCF) 630 components, or a combination thereof, from a non-local memory storage location, such as a cloud computing environment (CCE) 250, likewise described in greater detail herein. In various embodiments, the replacement NVMe 622 memory may be implemented without a BP 224. Nonetheless, the replacement NVMe 622 memory may be implemented in certain of these embodiments to still receive, store, manage, and provide access to one or more RF 626 components, one or more PFF 628 components, or one or more PCF 630 components, or a combination thereof, from a non-local memory storage location, such as CCE 250. In various embodiments, the network interface 232 may be implemented to provide access and connectivity to a network 140. In turn, the network 140 may be implemented in various embodiments to provide access and connectivity to a CCE 250.

Referring now to FIG. 6a, extended firmware management operations may be initiated by power being applied 432 to the ASDFMP 300 in pre-boot time (BT) step '1' 670. An embedded controller (EC) 210 is then invoked in BT step '2' 672 for future use in one or more extended firmware management operations, as described in greater detail herein. Thereafter, one or more security (SEC) 434 phase operations, described in greater detail herein, may then be performed in BT step '3' 74, followed by the performance of one or more Pre Extensible Firmware Interface (EFI) Initialization (PEI) 436 phase operations, likewise described in greater detail herein, in BT step '4' 676.

In various embodiments, performance of the PEI 436 phase operation in BT step '4' 576 may include one of more memory discovery operations 540 being performed. In various embodiments, the one or more memory discovery operations 540 may be performed in BT step '5' 678 to determine which kind of memory, and its associated configuration and capabilities, may be implemented within the ASDFMP 300. In various embodiments, an extended firmware backup and restore (EFBR) 558 system, described in greater detail herein, may be used to retrieve the configuration ID from the replacement NVMe 622 memory.

In various embodiments, the retrieved configuration ID for the replacement NVMe 622 memory may then be compared 642 in BT step '6' 680 to the configuration ID 634 stored in the EC 210. In various embodiments, the configuration ID comparison operations performed in BT step '6' 680 may result in a determination may being made in BT step '7' 682 that replacement NVMe 622 memory has been detected. In various embodiments, the detection of replacement NVMe 622 memory having a configuration ID different than the configuration ID 634 may provide an indication that the current BIOS component configuration stored in the replacement NVMe 622 memory may be different than that which it replaced, and as a result, the ASDFMP 300 may not boot properly.

Accordingly, in various embodiments, detection of replacement NVMe 622 memory may result in the EFBR 558 system being used to retrieve the UFB stored in the EC 210 that corresponds to configuration ID 634. In various embodiments, the retrieved UFB may then be provided 648 in BT step '9' 686 to a particular non-local memory storage location, such as CCE 250. In various embodiments, the EFBR 558 system may be implemented to use the configuration ID 634 stored in the EC 210 to validate the previously-retrieved UFB. Once the previously-retrieved UFB has been validated, the EFBR 558 system may be used in BT step '10' to provide 650 the firmware stored in the repository of recovery firmware 632 that corresponds to the validated UFB to the replacement NVMe 622 memory, where it is stored in its associated BP 224. In various embodiments, new details associated with the replacement NVMe 622 memory, along with other details associated with the ASDFMP 300, may then be used to generate a new UFB, which then stored in the EC 210, along with an updated configuration ID 634, for use in future extended firmware management operations.

In various embodiments, one or more platform-specific PEI drivers 652 may be retrieved and then implemented within the ASDFMP 300 in BT step 11' 690, followed a DXE core 654 may being loaded in BT step '12' 654. In various embodiments, a Driver execution Environment (DXE) 442 phase may then be entered in BT step '13' 694, followed by the retrieval and implementation of one or more PE drivers 656 and one or more other platform drivers 658. In various embodiments, the one or more PE drivers 656, and the one or more other platform drivers 658, may respectively be used to initiate the PE 660 and other platform devices 662 associated with the ASDFMP 300. In various embodiments, a Boot Device Selection (BDS) 450 phase may then be entered in BT step '14' 696, followed by the use of a boot loader 556 to boot the ASDFMP 300 to an operational state.

Figure 7:
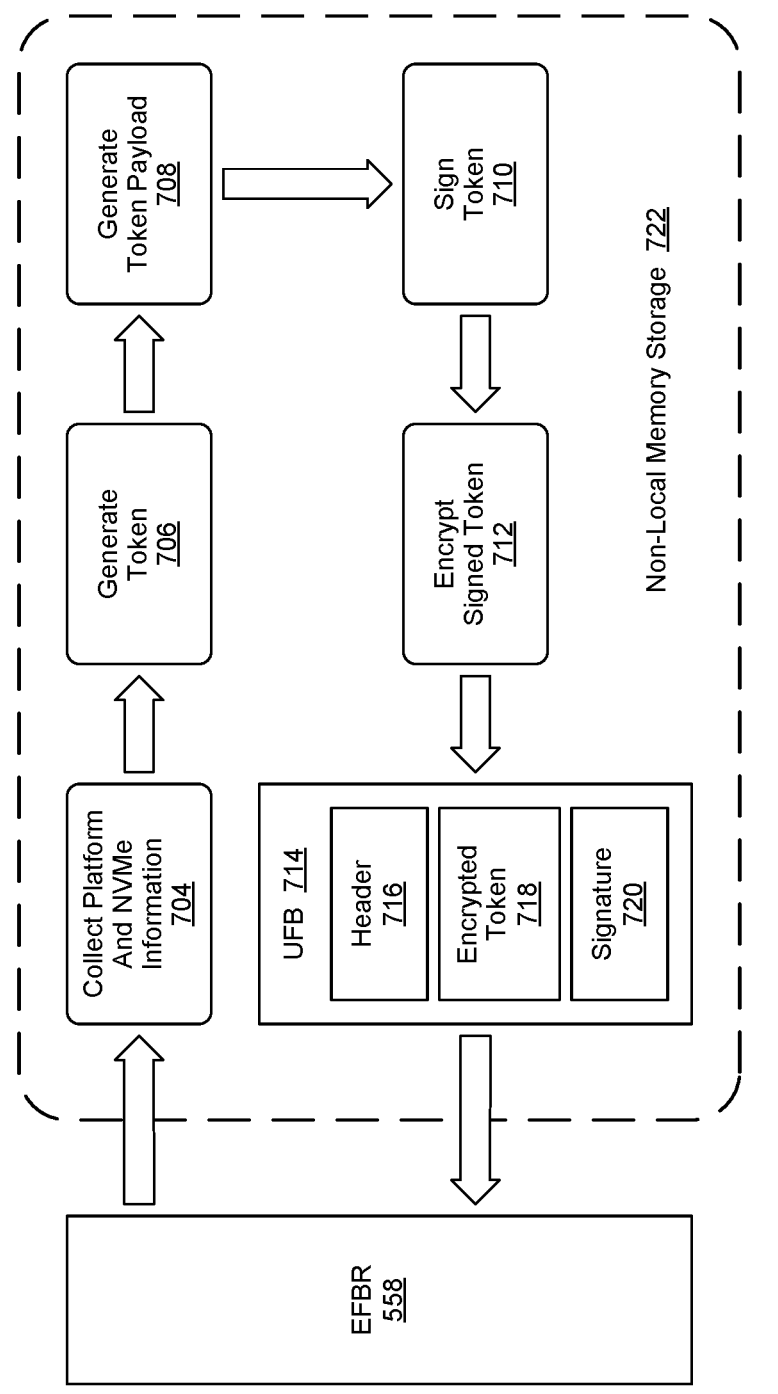
FIG. 7 is a simplified block diagram showing the performance of extended firmware management operations to generate a universal firmware binary large object (UFB).

FIG. 7 is a simplified block diagram showing the performance of extended firmware management operations implemented in accordance with an embodiment of the invention to generate a universal firmware binary large object (UFB). In various embodiments, an extended firmware backup and restore (EFBR) 558 system, described in greater detail herein, may be implemented to collect certain architecture specific distributed firmware management platform (ASDFMP) and certain Non-Volatile Memory express (NVMe) information, in step 704, as described in greater detail herein. In various embodiments the EFBR 558 system may then be implemented to generate a token in step 706, followed by the generation of a token payload in step 708.

In various embodiments, the token payload may be generated in Javascript Object Notation (JSON) format, such as:

```
{
"system_id": "<SID>",
"service_tag": "<SERVICE_TAG>",
"bios_version": "<BIOS VERSION>",
"dvid": "<DVID>",
"nsid": "<NSID>"
}
```

In various embodiments, the resulting token may then be digitally signed in step 710, using cryptographic approaches known to skilled practitioners of the art. In these embodiments, the entity authorized to digitally sign the token, and the method by which it may be signed, is a matter of design choice.

In various embodiments, the digitally signed token may then be encrypted in step 712. In these embodiments, the method by which the signed token may be encrypted is a matter of design choice. In various embodiments, the EFBP 558 system may then be implemented to embed the resulting encrypted token 718 within a UFP 714, along with a header 716 and the previously-generated digital signature 720.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

providing an information handling system with a distributed BIOS, the distributed BIOS including a BIOS component and a BIOS variable, the distributed BIOS being implemented to function with any of a plurality of processor environments, each of the plurality of processing environments implementing a respective processor architecture;

identifying a processor environment installed on an information handling system from the plurality of processor environments;

performing an extended firmware management operation, the extended firmware management operation recovering a copy of the BIOS component of the distributed BIOS from a remote memory storage location.

2. The method of claim 1, wherein:

the extended firmware management operation uses an extended firmware backup and restore protocol when recovering the copy of the BIOS component from a remote memory storage location.

3. The method of claim 2, wherein:

the extended firmware management operation uses the extended firmware backup and restore protocol to generate a universal firmware binary large object.

4. The method of claim 1, wherein:

the BIOS component includes an associated unique configuration identifier.

5. The method of claim 4, wherein:

the associated unique configuration identifier is stored to an embedded controller of the information handling system.

6. The method of claim 1, wherein:

the extended firmware management operation is automatically performed upon detection of replacement of a non-volatile memory of the information handling system.

7. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing an information handling system with a distributed BIOS, the distributed BIOS including a BIOS component and a BIOS variable, the distributed BIOS being implemented to function with any of a plurality of processor environments, each of the plurality of processing environments implementing a respective processor architecture;

identifying a processor environment installed on an information handling system from the plurality of processor environments;

performing an extended firmware management operation, the extended firmware management operation recovering a copy of the BIOS component of the distributed BIOS from a remote memory storage location.

8. The system of claim 7, wherein:

the extended firmware management operation uses an extended firmware backup and restore protocol when recovering the copy of the BIOS component from a remote memory storage location.

9. The system of claim 8, wherein:

the extended firmware management operation uses the extended firmware backup and restore protocol to generate a universal firmware binary large object.

10. The system of claim 7, wherein:

the BIOS component includes an associated unique configuration identifier.

11. The system of claim 10, wherein:

the associated unique configuration identifier is stored to an embedded controller of the information handling system.

12. The system of claim 10, wherein:

the extended firmware management operation is automatically performed upon detection of replacement of a non-volatile memory of the information handling system.

13. A non-transitory, computer-readable storage medium embodying computer program code, the computer program code comprising computer executable instructions configured for:

providing an information handling system with a distributed BIOS, the distributed BIOS including a BIOS component and a BIOS variable, the distributed BIOS being implemented to function with any of a plurality of processor environments, each of the plurality of processing environments implementing a respective processor architecture;

identifying a processor environment installed on an information handling system from the plurality of processor environments;

performing an extended firmware management operation, the extended firmware management operation recovering a copy of the BIOS component of the distributed BIOS from a remote memory storage location.

14. The non-transitory, computer-readable storage medium of claim 13, wherein:

the extended firmware management operation uses an extended firmware backup and restore protocol when recovering the copy of the BIOS component from a remote memory storage location.

15. The non-transitory, computer-readable storage medium of claim 14, wherein:

the extended firmware management operation uses the extended firmware backup and restore protocol to generate a universal firmware binary large object.

16. The non-transitory, computer-readable storage medium of claim 13, wherein:

the BIOS component includes an associated unique configuration identifier.

17. The non-transitory, computer-readable storage medium of claim 16, wherein:

the associated unique configuration identifier is stored to an embedded controller of the information handling system.

18. The non-transitory, computer-readable storage medium of claim 17, wherein:

the extended firmware management operation is automatically performed upon detection of replacement of a non-volatile memory of the information handling system.

19. The non-transitory, computer-readable storage medium of claim 13, wherein:

the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *